(No Model.)
L. D. CASTLE.
SCREW TAP.
No. 373,270.  Patented Nov. 15, 1887.
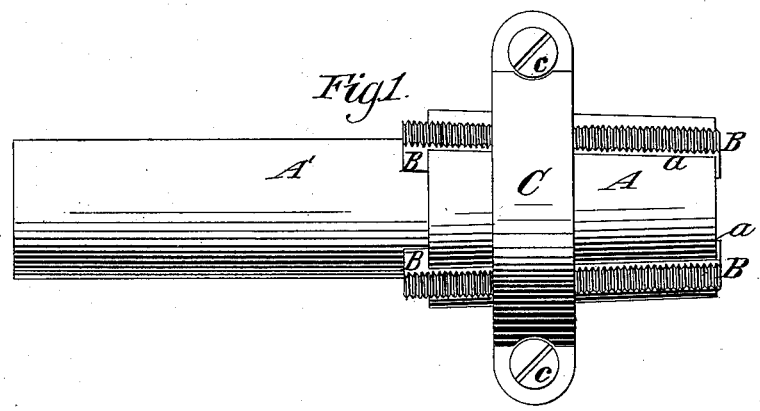
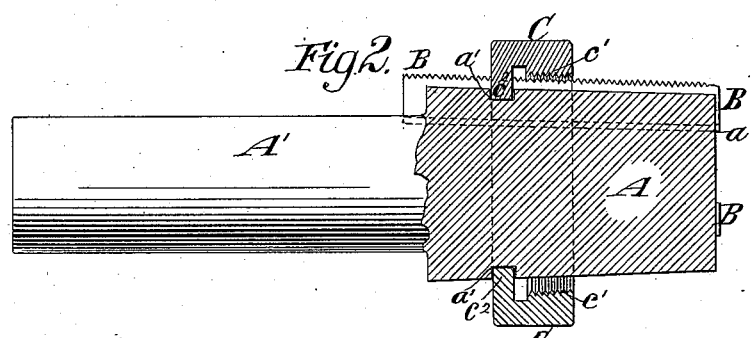
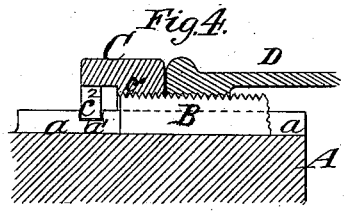
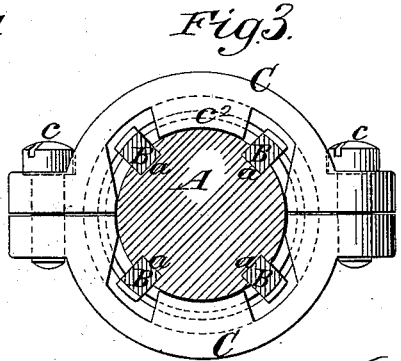
Witnesses.
Emil Herter
O. B. Sundgren
Inventor:
Lewis D. Castle
by his Att'ys
Brown & Hall.

UNITED STATES PATENT OFFICE.

LEWIS D. CASTLE, OF JERSEY CITY, NEW JERSEY.

SCREW-TAP.

SPECIFICATION forming part of Letters Patent No. 373,270, dated November 15, 1887.

Application filed August 25, 1887. Serial No. 247,812. (No model.)

*To all whom it may concern:*

Be it known that I, LEWIS D. CASTLE, of Jersey City, in the county of Hudson and State of New Jersey, have invented a new and useful Improvement in Screw-Taps, of which the following is a specification.

My invention is applicable to those taps which consist of a body grooved lengthwise at intervals in its circumference and having fitted in such grooves or seats sliding chasers or tap-blocks, which may be separate from each other. An important advantage of such taps is that the tap-body may be made of mild machinery-steel, while the threaded chasers or blocks may be made of the finest and most expensive quality of tool-steel, and may be readily replaced in case they or the thread-sections upon any one of them become broken. Another advantage of this kind of taps is, that by making the tap-body taper and the grooves or cutter-seats with inclined bottoms adjustment may be made to compensate for wear.

The invention relates to that class of taps in which a divided band or collar internally threaded encircles the body, with its thread engaging the thread-sections of the cutters or chasers, and by being clamped upon the body serves to hold the cutters or chasers lengthwise thereof, said band or collar being held against lengthwise movement upon the body. In one tap of this character heretofore made the band or collar has been fitted in an annular groove or seat upon a body formed by two flanges or circumferential ribs projecting from the body; but an objection to this tap is that the portions of the cutters or chasers which are covered by the rib or flange of the body nearest the smaller end thereof are not exposed for use, and hence the cutters or chasers cannot be worn down to so short a length as they could were the whole length of the cutters or chasers which are exposed beyond the front edge of the band or collar available for use.

An important object of my invention is to provide for securing and clamping the band or collar upon a tap-body in such manner as to dispense with any circumferential rib or flange upon the body below the band or collar and to expose the cutters or chasers for work clear up to the front side or edge of the band or collar, whereby I enable the chasers or cutters to be used until they are considerably shorter than is possible in the tap above described and enable a greater number of holes—perhaps a thousand more—to be tapped with one set of cutters or chasers than can be done with the tap just described.

To this end the invention consists in the combination, with the tap-body provided with longitudinal grooves and threaded cutters or chasers sliding therein, of a divided band or collar clamped on the body and threaded internally to engage the thread-sections of the cutters or chasers and confined lengthwise of the body by projections on the one engaging recesses in the other at points rearward of the thread in the band or collar, or more distant than the thread from the small end of the tap.

In the accompanying drawings, Figure 1 is a side view of a tap embodying my invention. Fig. 2 is a longitudinal section of the entire tap, save the shank portion. Fig. 3 represents a transverse section of the tap-body and its chasers or cutters and an end or side view of the divided clamping band or collar, and Fig. 4 is a sectional view representing parts of my improved tap and of a fitting to which it is being applied.

Similar letters of reference designate corresponding parts in all the figures.

A designates the body of the tap, which is provided with a shank portion, A', and is of substantially cylindric form, it preferably having, however, a slight taper in the direction of its length.

Formed in the tap-body A and extending lengthwise thereof are a number of longitudinal grooves or cutter-seats, (four being here represented,) at equidistant points around the circumference, and in these grooves or cutter-seats are fitted cutters or chasers B, which are free to slide in their seats and on their exterior surfaces are provided with sections of a screw-thread. The portions of the chasers or cutters which are nearest the point or smaller end of the tap are those which are at any time in use, and as such portions become worn out other portions are brought into use by feeding or moving the cutters or chasers in their seats *a* toward the smaller end of the tap.

To secure the cutters or chasers B in proper position lengthwise of the body, so that their thread-sections will be in accurate spiral alignment, I employ a clamping band or collar, C, which encircles the tap-body and is divided, it being here shown as composed of two semicircular sections which are drawn together and clamped upon the body by screws or bolts $c$. The portion of the interior of the band or collar which is nearest its front or nearest the smaller end of the tap is internally threaded, as shown at $c'$, so as to engage the thread-sections of the chasers or cutters, and if the band or collar is held against movement lengthwise of the tap-body it will be obvious that it will also serve to hold all the chasers or cutters against lengthwise movement.

The means which I employ to hold the band or collar against lengthwise movement upon the body are projections from the one part engaging recesses in the other part. In this example of the invention segmental projections $c^2$ project inwardly on the band or collar and engage with recesses $a'$, formed, as here shown, by an annular groove in the tap-body, which is intercepted by the chasers or cutters B.

An essential feature of my invention consists in the arrangement of these engaging or interlocking projections and recesses at a point back of the internal thread, $c'$, of the collar, or at a point more distant than said thread from the smaller end of the tap. It will then be seen that the chasers or cutters may be moved forward until almost their entire length is worn out and still be held by the band or collar, and it will also be seen that the portions of the chasers or cutters which project beyond the band or collar are for their entire length exposed for use. This is best illustrated by Fig. 4, which represents a sectional view of a portion of the tap and also a portion of a fitting, D, upon which the tap is operating, and it will therefore be seen that, inasmuch as the entire length of chaser or cutter beyond the band or collar C is exposed, the chaser or cutter may work into the fitting D until the band or collar abuts against the end thereof. This enables a longer use of the chasers or cutters than would otherwise be possible, and enables, perhaps, a thousand more holes to be threaded by one set of chasers or cutters than would be possible if the portions of the chasers or cutters beyond the band or collar were protected by an annular rib or flange, so as to prevent their use.

My invention is more particularly intended for use in threading pipe-fittings; but it may, obviously, be used for general machine-work.

What I claim as my invention, and desire to secure by Letters Patent, is—

The combination, with a tap body provided with longitudinal grooves and threaded cutters or chasers sliding therein, of a divided band or collar clamped on the body and threaded internally to engage the thread-sections of the cutters or chasers and confined lengthwise of the body by projections on the one engaging recesses in the other at points rearward of the thread in the band or collar, or more distant than the thread from the smaller end of the tap, substantially as and for the purpose herein described.

LEWIS D. CASTLE.

Witnesses:
C. HALL,
FREDK. HAYNES.